Jan. 6, 1953

H. F. HILD 2,624,269

TOASTER

Filed Oct. 10, 1947

Inventor —
Henry F. Hild
by his Attorneys
Howson & Howson

FIG. 2.

Inventor —
Henry F. Hild
by his Attorneys
Howson & Howson

Jan. 6, 1953  H. F. HILD  2,624,269
TOASTER
Filed Oct. 10, 1947  6 Sheets-Sheet 3

Inventor —
Henry F. Hild
by his Attorneys
Howson & Howson

Jan. 6, 1953    H. F. HILD    2,624,269
TOASTER
Filed Oct. 10, 1947    6 Sheets-Sheet 6

*Inventor —*
*Henry F. Hild*
*by his Attorneys*
*Howson & Howson*

Patented Jan. 6, 1953

2,624,269

UNITED STATES PATENT OFFICE 2,624,269

TOASTER

Henry F. Hild, Merion Park, Pa., assignor to Proctor Electric Company, Philadelphia, Pa., a corporation of Pennsylvania Application October 10, 1947, Serial No. 779,137

13 Claims. (Cl. 99—329)

This invention relates to bread toasters, and more particularly to toasters of the type employing a movable bread carriage, latch means associated therewith, and means for automatically tripping the latch means at the end of the toasting operation.

One object of the present invention is to provide an improved toaster of this general character.

Another object of the invention is to provide improved means for controlling the operation and for tripping the latch means in such a toaster.

The present invention further relates to toasters of the type which are adapted to toast bread to any desired color and to any desired degree of crispness. More particularly the invention relates to a toaster of the type disclosed in prior Patent No. 2,388,641 issued November 6, 1945, to J. W. Myers. In such a toaster, the coloring and crisping functions are performed during successive parts of a toasting cycle.

A further object of this invention is to provide an improved toaster of the type disclosed in the above-mentioned Myers patent.

Still another object of this invention is to provide improved means, in such a toaster, for controlling the toasting operation so as to produce exactly the color and degree of crispness desired by the user.

A further object of the invention is to provide a toaster which, when adjusted for a desired color and a desired degree of crispness, will produce that color and degree of crispness in successive bread slices.

Another object of the invention is to provide novel and improved means for controlling the crisping part of the toasting cycle in a toaster of the above-mentioned character.

A further object of the invention is to provide, in such a toaster, means for preventing the crisping operation from producing a color of the toast other than that desired.

Other objects and features of the invention will be apparent from the following detailed description.

Figure 3:
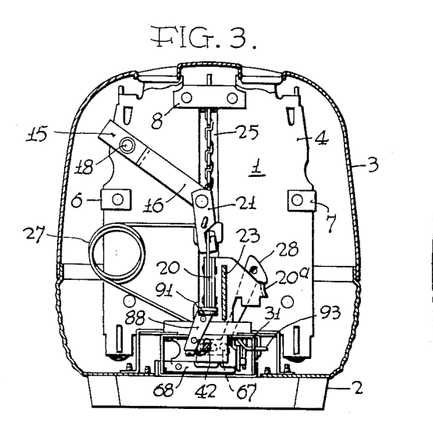
Fig. 3 is a relatively small scale sectional view taken along line 3—3 of Fig. 1.
Figure 4:
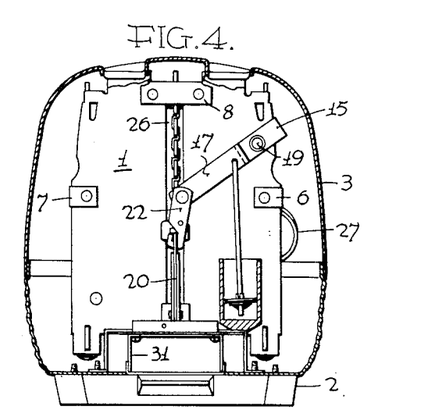
Fig. 4 is a similar view taken along line 4—4 of Fig. 1.
Figure 5:
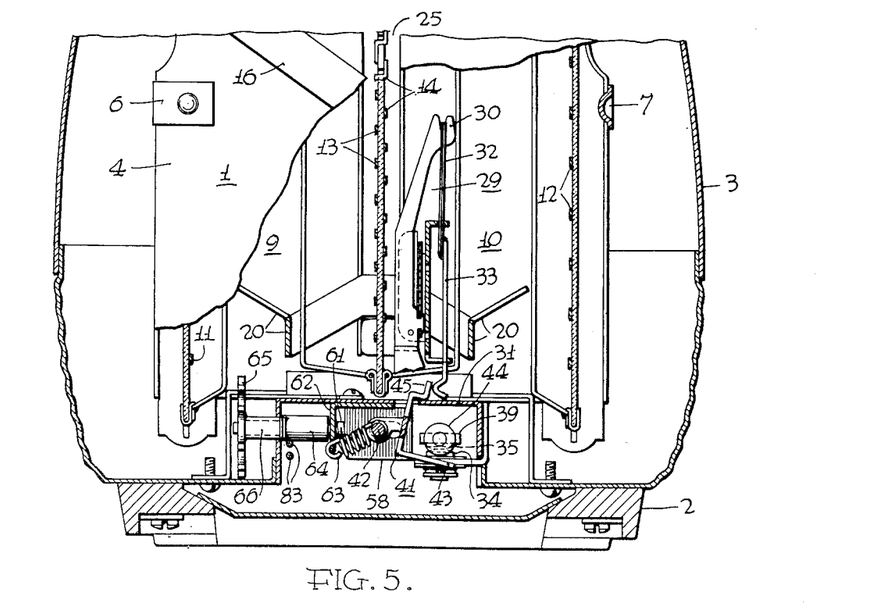
Fig. 5 is a fragmentary sectional view taken along line 5—5 of Fig. 1.

Referring first to Figs. 1 and 3 to 6, the toaster illustrated is of the type having two bread wells and having a vertically movable bread carriage which is held in lowered position during the toasting operation and which is caused to move upward to eject the toasted bread slices at the end of the toasting operation. As shown in Figs. 3 and 4, the toaster comprises a supporting framework 1 mounted on a base 2, and an enclosure or casing 3 also mounted on the base and surrounding the framework 1. The framework 1 comprises end plates 4 and 5, side connecting bars 6 and 7, and a top connecting member 8. Within the framework are the two bread wells 9 and 10 (Fig. 5) with which there are associated outer heater elements 11 and 12 and inner heating elements 13 and 14.

A bread carriage support 15 extends along one side of the supporting framework 1 and has arms 16 and 17 which are pivotally supported on the end plates at 18 and 19. The free ends of arms 16 and 17 are interconnected with the bread carriage 20 through links 21 and 22. Attached to the bread carriage is a bracket 23 (Fig. 1) which extends externally of the toaster casing at one end thereof and which carries a knob 24. The bread carriage is slidably supported in vertical slots 25 and 26 of the end plates 4 and 5 so as to be movable between raised and lowered positions. A spring 27 has one end secured to the link 21 and has its other end anchored at the base of the toaster, and said spring urges the bread carriage toward its raised position. The bread carriage is movable downwardly against the action of the spring 27 by means of the knob 24 and it is latched in its lowered position by a latch member 28 which is adapted to engage a finger 20a on the bread carriage. As in some prior automatic toasters, the lowering of the bread carriage to its latched position initiates the toasting operation, and said operation is terminated by automatic release of the bread carriage.

Figures 9, 11, 12:
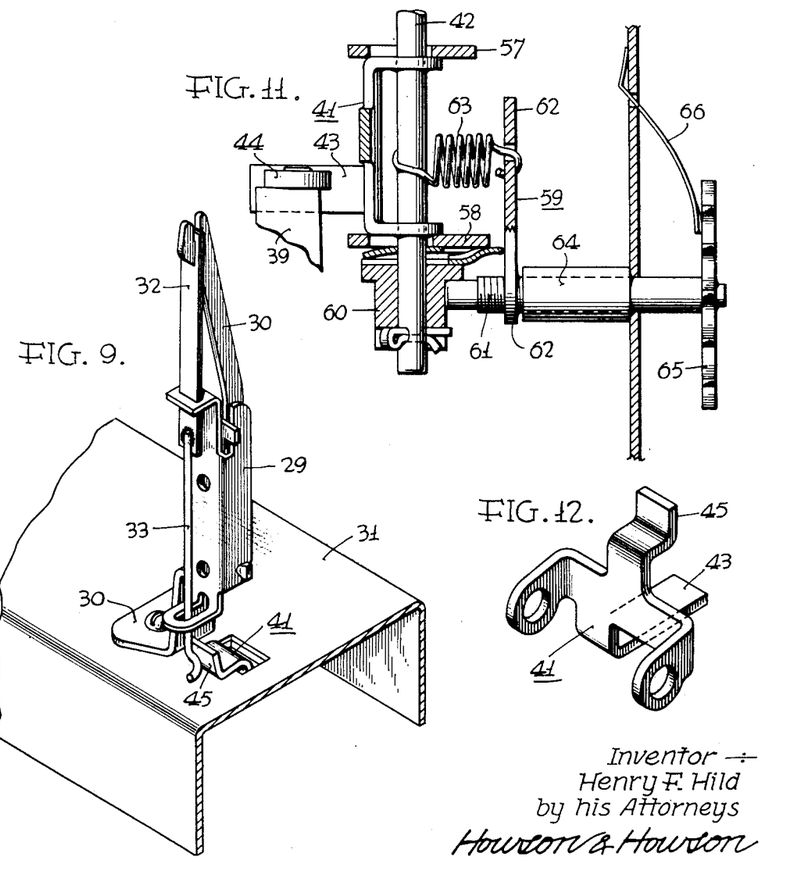
Fig. 9 is a perspective view showing the thermostatic device which is preferably employed in the toaster.
Fig. 11 is a detail sectional view taken along line 11—11 of Fig. 10.
Fig. 12 is a perspective view of the contact lifter.

A thermostatic device 29 (Figs. 5 and 9), disposed in cooperative relation with one of the bread wells, serves to control the toasting operation in response to the surface temperature of one of the bread slices. The present invention is not concerned with the details of construction of the thermostatic device which may be of the character disclosed and claimed in a copending Stevenson et al. application, Serial No. 777,120, filed October 10, 1947. It suffices for the present purpose to note that the thermostatic device shown comprises a support 30 mounted on a top of an inverted channel member 31, and a bimetal element 32 suspended from the top of said support and carrying an extension wire 33 which operates a controlling switch as described below.

Figure 1:
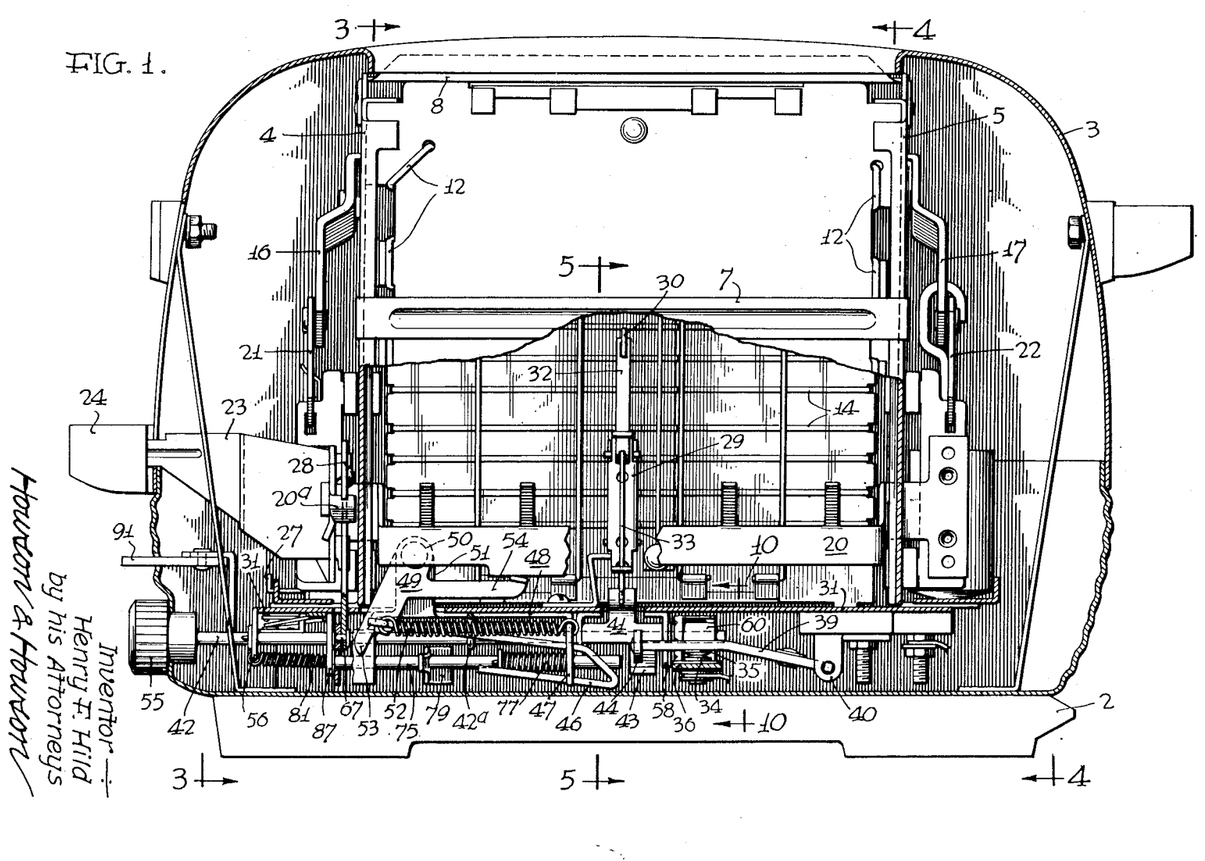
Fig. 1 is a longitudinal sectional view of a toaster embodying the invention.
Figure 2:
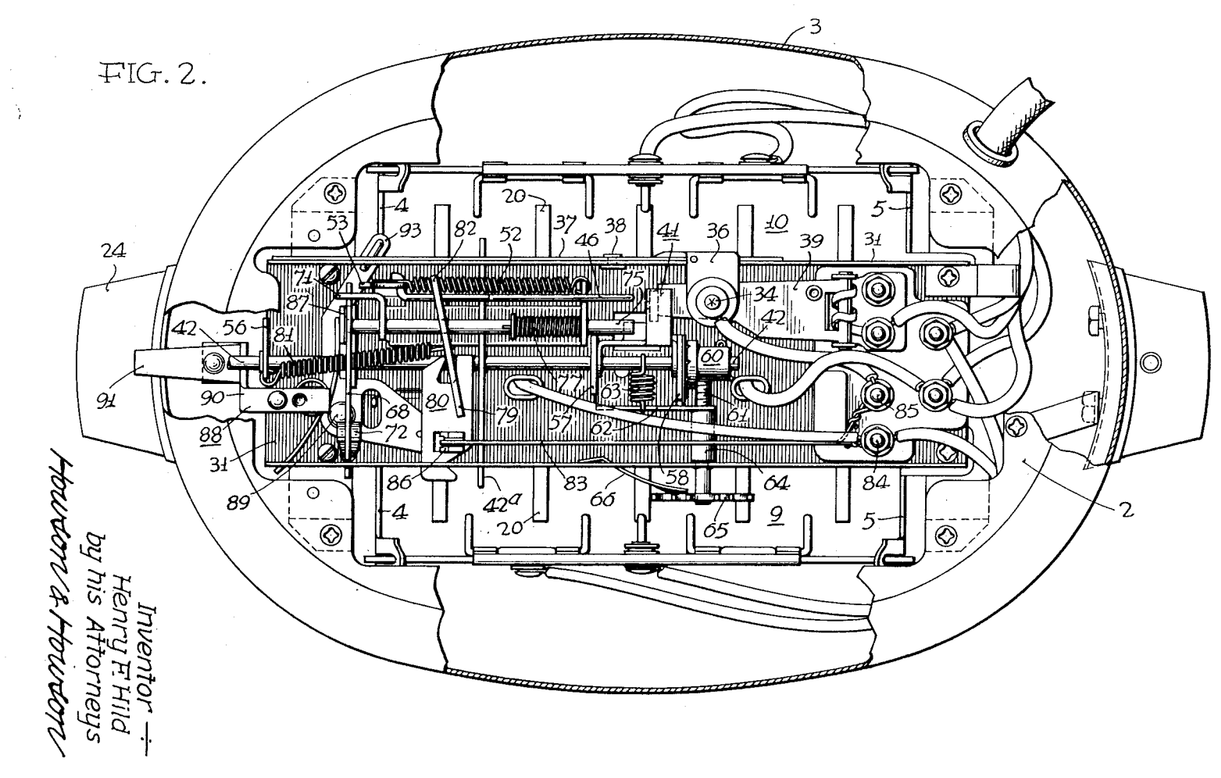
Fig. 2 is a bottom view with the casing broken away to show the mechanism in the base of the toaster.
Figure 10:
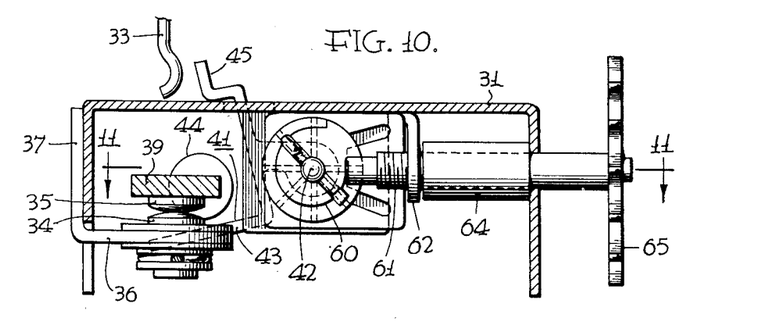
Fig. 10 is a detail sectional view taken along line 10—10 of Fig. 1.

The controlling switch (Fig. 10) comprises a lower contact 34 and an upper contact 35. The lower contact 34 is mounted on a laterally extending arm 36 of lever 37 which is pivotally mounted at 38 (Figs. 2 and 19) on one side of the inverted channel member 31. The purpose of this arrangement will be apparent later. The upper contact 35 is carried by an arm 39 (Fig. 7) which is freely pivoted on a supporting bracket 40 fixedly secured to member 31. The upper contact thus tends to engage the lower contact due to gravity acting on arm 39. The switch is opened by a contact lifter 41 (Figs. 5, 7 and 12) which is freely pivoted on a shaft 42 the main purpose of which will appear later. The lifter 41 has a finger 43 which is disposed below the end of arm 39 on which there is an insulating element 44. Another finger 45 on lifter 41 extends through an opening in member 31 and limits gravitational movement of the lifter. When the lifter is actuated against gravity, it lifts the arm 39 thus moving the upper contact 35 out of engagement with the lower contact 34.

When the bread carriage 20 is raised, the lifter 41 is raised by a cam wire 46 (Fig. 1) which engages and raises the lifter 41 to lift arm 39 and hold the switch open. When the bread carriage is lowered, as in Fig. 1, the cam wire 46 is ineffective and the switch is permitted to close. The cam wire 46 is slidably supported by a turned-down portion 47 of a bracket 48 (Fig. 17) secured to member 31, and said wire is secured to a bell crank lever 49 which is pivotally mounted at 50 on turned-up portion 51 of the bracket 48. A spring 52 is attached to the depending arm 53 of the bell crank lever 49 and to the bracket 48. The spring urges the cam wire 46 toward the lifter 41, but when the bread carriage is lowered it engages arm 54 of the bell crank lever 49, causing retraction of the cam wire 46.

During operation of the toaster, when the switch contacts 34 and 35 are closed, wire 33 (Figs. 5 and 9) of the thermostatic device 29 moves toward the lifter 41 and actuates the same to open the switch contacts.

As previously indicated, the toaster is adapted to produce both a desired color and a desired degree of crispness of the bread slices being toasted, and it operates according to the general principles disclosed in the above-mentioned Myers Patent No. 2,388,641. As described in that patent, the cycle of operation is effectively divided into two parts, the desired coloring of the bread being produced during a first part of the toasting cycle, and the desired crispness of the bread being produced during the second part of the cycle. In the present device, there is provided a color control knob 55 which is mounted on one end of the rotatable shaft 42. The shaft 42 is supported at one end by an ear 56 turned down from an end of member 31, and is supported at its opposite end by a pair of ears 57 and 58 on a bracket 59 secured to the underside of member 31. A wire spring 42a (Fig. 2) extends transversely between the sides of member 31 and underlies the shaft 42, acting as a resilient support therefor. The supporting ear 56 has a vertical slot to permit slight vertical movement of the outer end of the shaft 42 for a purpose which will appear later. The ears 57 and 58 have horizontal slots therein to permit slight horizontal movement of the inner end of shaft 42. On the inner end of the shaft 42, there is a cam 60 (Fig. 11) which engages a screw 61 threadedly supported by an ear 62 on the bracket 59. A tension spring 63 is interconnected between the shaft 42 and the ear 62 and serves to maintain the cam 60 in engagement with the screw 61. Assuming a certain position of screw 61, rotation of the cam 60 through the medium of knob 55 effects slight lateral movement of the inner end of shaft 42 and varies the position of the finger 43 of the contact lifter 41. The effect of this is to vary the amount of movement of the wire element 33 on the thermostatic device 29 which is necessary to cause opening of the switch contacts 34 and 35. Thus the color-producing part of the toasting cycle is variable in duration according to the setting of the color control knob 55. The screw 61 extends through a sleeve 64 and through one side of member 31 and carries a manually-rotatable wheel 65 at its outer end. A leaf spring 66 has one end supported by the side of member 31 and has its other end in frictional engagement with the wheel 65. The purpose of this arrangement is to enable adjustment at the factory of the screw 61 so as to assure proper operation of the color adjustment.

Figure 14:
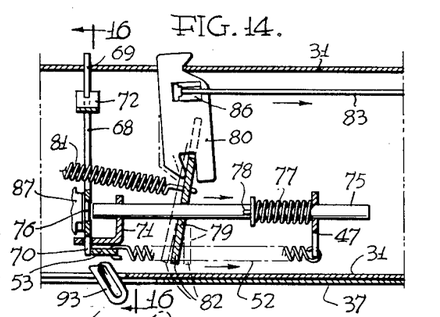
Fig. 14 is a similar view showing the ratchet device in operation.
Figures 15, 16, 17, 18, 19:
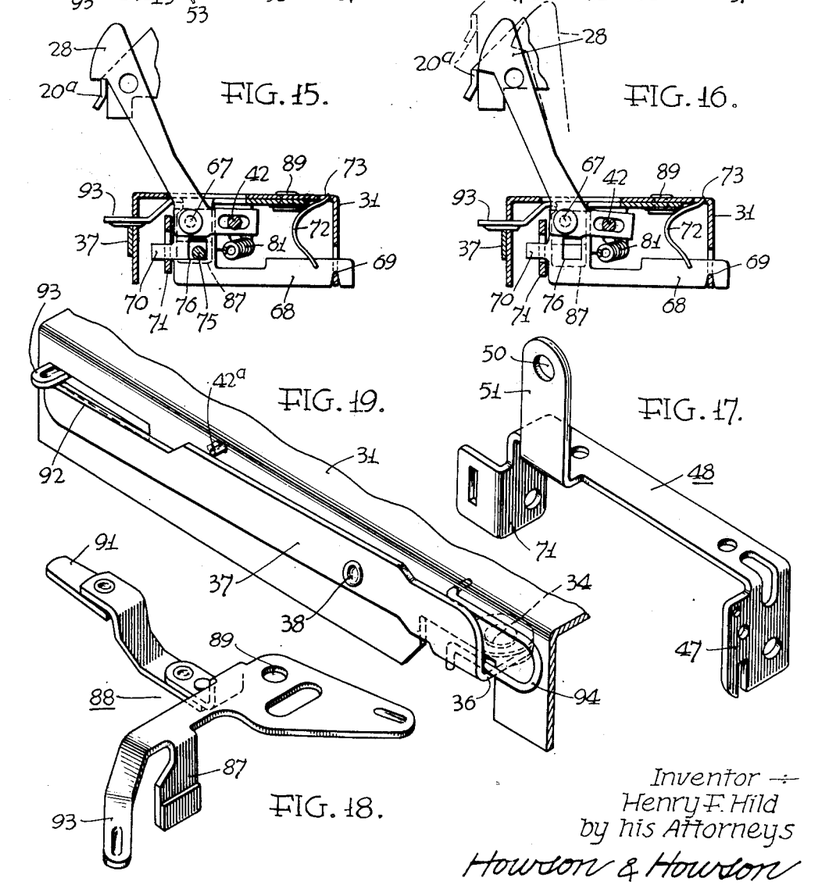
Fig. 15 is a sectional view taken along line 15—15 of Fig. 13.
Fig. 16 is a sectional view taken along line 16—16 of Fig. 14.
Fig. 17 is a perspective view of the bracket which supports the sliding rod of the ratchet device.
Fig. 18 is a perspective view of the crispness control member.
Fig. 19 is a perspective view illustrating the compensating mechanism employed to prevent undesirable darkening of the toast during the crisping part of the toasting cycle.

The latch member 28, previously mentioned, is mounted at 67 (Figs. 7, 15 and 16) on a lever 68 which is fulcrumed at one side of member 31 at 69, and which has a projection 70 at its opposite end retained in a slotted ear 71 of bracket 48. A leaf spring 72 has one end anchored at 73 and has its other end in engagement with the lever 68 to urge the latter downward. The latch member 28 has a slotted extension 74 through which the shaft 42 extends. The latch member 28 is controlled by a longitudinally movable latch bar in the form of a rod 75 (Figs. 13 and 14) which is slidably carried by ears 47 and 71 on the bracket 48, and which normally extends through an opening 76 in lever 68. This rod has an associated spring 77 which urges it toward the left, as viewed in Figs. 13 and 14, the spring acting between ear 47 and a flange or offset 78 on the rod. As long as the rod 75 projects through the lever 68, it holds the latch member 28 in latched position, as shown in Fig. 15. The rod 75 constitutes one element of a friction ratchet device, the other element of which is a jam plate 79 having one end swivelly interfitted with a plate 80 which in turn is swivelly mounted on one side of member 31. The jam plate 79 has an opening therein through which the rod 75 extends. A spring 81 has one end secured to the plate 79 and has its other end secured to the depending ear 56. This spring urges the jam plate toward the outer end of the rod 75. At its free end, the plate 79 has an extending finger 82, which is engageable by arm 53 of bell-crank lever 49. When the bread carriage is in raised position, the bell-crank lever 49 causes the jam plate 79 to be positioned substantially at right angles to the rod 75, thus enabling the rod to assume its latch retaining position. However, when the bread carriage is lowered, it engages the bell-crank lever 49 and moves the latter away from the jam plate 79, permitting the spring 81 to move the jam plate to an angular position in which it is in snug frictional engagement with the rod 75.

Figures 6, 7, 8:
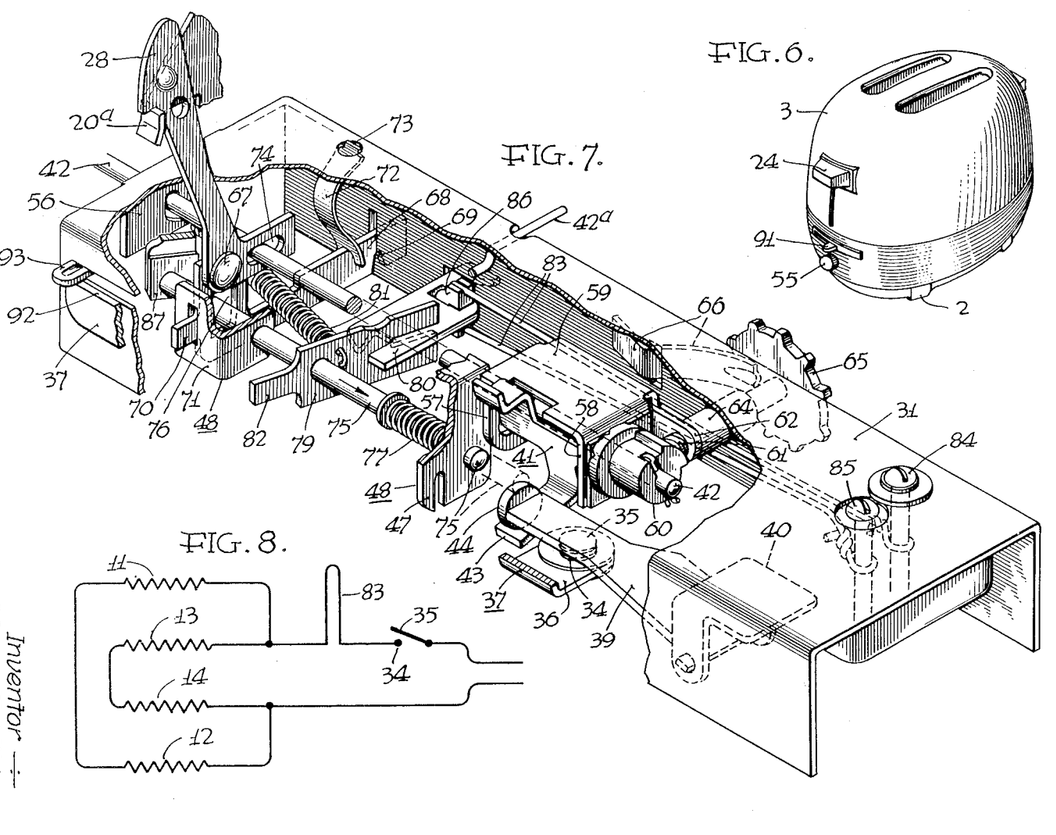
Fig. 6 is a miniature perspective view of the toaster.
Fig. 7 is a perspective view of the mechanism which is located in the base of the toaster, a portion of the channel-shaped box being broken away for the purpose of illustration.
Fig. 8 is a diagrammatic illustration of the electrical circuit of the toaster.
Figure 13:
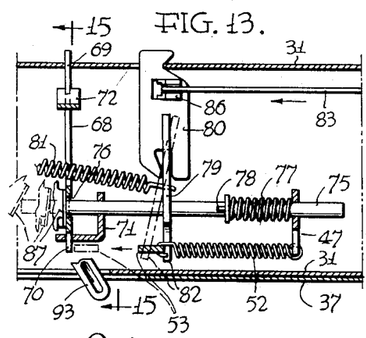
Fig. 13 is a sectional plan view showing the friction ratchet device when the toaster is inoperative.

Ratchet movement of the rod 75 is effected by means of an expansible and contractible wire 83 of the character employed in the device of the above-mentioned Myers Patent No. 2,388,641. The wire 83 has its ends secured to terminals 84 and 85 and is looped about an insulator element 86 carried by plate 80. This wire is in circuit with the heating elements and with the switch 34, 35, as shown in Fig. 8, so that current flows through the wire when the switch is closed. The expansion of the wire, due to the heating thereof by the current flow, permits a slight creep of the jam plate 79 along rod 75. When the switch 34, 35 opens, the wire cools and contracts and it causes the jam plate 79 to move the rod 75 inwardly a slight amount. The above-described action is depicted in Figs. 13 and 14. Repeated expansion and contraction of the wire 83 will cause repetition of such action and consequent step-by-step movement of the rod 75. Thus the wire 83 constitutes an electro-thermomotive means which is movable reciprocally, and the rod 75 is moved unidirectionally and rectilinearly in response to the reciprocating motion of the wire.

The outer end of rod 75 is engageable by a depending finger 87 on a crispness control member 88 (Figs. 2 and 18) which is pivotally mounted at 89 and which has an extending arm 90 carrying a manually-operable element 91. The positioning of member 88 determines the position of rod 75 for each toasting operation. When the element 91 is set for very soft toast, the rod 75 barely engages the lever 68, as in Fig. 13, and the latch member 28 is released in response to a single operation of the switch 34, 35. However, when the element 91 is set for crisp toast, the rod 75 projects beyond the lever 68 and successive openings of the switch 34, 35 are required to effect step-by-step movement of the rod 75 until the latch member 28 is released. Release of the latch member, as shown in Fig. 16, enables the finger 28a to deflect the latch member and thus permit upward movement of the bread carriage.

It should be noted that during step-by-step movement of the rod 75, the rod is held in each of its advanced positions by frictional engagement of the latch lever 68 with said rod caused by the lift spring 27 for the bread carriage. As may be seen in Fig. 15, the upward force on latch member 28, due to the carriage lift spring, causes the lever 68 frictionally to engage the bottom of rod 75.

The crisping operation takes place by virtue of intermittent energization, and consequent lower average energy input, of the heating elements of the toaster to maintain a dehydrating temperature. While the successive periods of energization during the crisping operation are short in comparison to period of energization during the preceding coloring operation, they tend to add small increments to the color of the toast. In order to prevent the crisping operation from darkening the toast objectionably, an arrangement is provided to compensate for the darkening tendency. As previously mentioned, the lower contact 34 of the controlling switch is mounted on one end of lever 37. The opposite end of said lever has a cam edge 92 (see Fig. 19) which is engaged by a finger 93 on the crispness control member 88. A spring 94 urges the contact end of lever 37 downward, and the finger 93 acts as an adjustable stop for said lever. When the member 88 is set for crisp toast, the finger 93 in cooperation with the cam edge 92 permits the contact end of lever 37 to move slightly downward. This permits the upper contact 35 to drop further when the toasting cycle is initiated by depressing knob 24, and consequently a smaller movement of the thermostat wire 33 is required to open the contacts. As a result, a lighter color is produced during the coloring portion of the toasting cycle, and the color increments added during the crisping portion of the cycle produce the proper final color of the toast.

Considering now the operation of the toaster as a whole, it will be apparent from the foregoing description that when the toaster is inoperative, with the bread carriage in raised position, the switch 34, 35, is held open. It may be assumed first that it is desired to produce toast which is light in color and which has a soft moist interior. To accomplish this result, the color adjustment knob 55 is rotated to one extreme position which causes the upper contact of the switch to be positioned relatively close to the lower contact, and the crispness adjustment element 91 is moved to an extreme position which causes the rod 75 to barely engage lever 68. The latter adjustment causes the lower contact to be moved to its highest position, since the finger 93 depresses the associated end of lever 37.

When the bread carriage is depressed, the switch 34, 35 is permitted to close and the jam plate 79 is caused to assume an inclined position as previously described. Due to the setting for light toast, the thermostatic device 29 opens the switch after a relatively short period, and the latch member 28 is released as previously described. Consequently, the bread carriage is moved upward by spring 27 and the switch 34, 35 is held open.

If it is desired to make darker toast, with a soft moist interior, the color adjustment knob 55 is adjusted accordingly, causing the upper switch contact to move further away from the lower contact. The crispness control element 91 is set as before. The operation in this case is similar to that in the first case, but it takes longer for the thermostatic device to open the switch, and therefore the bread is toasted to a darker color.

If it is desired to make crisp toast, the crispness control element 91 is adjusted accordingly, and of course the color control knob is adjusted for the desired color. In this case, the rod 75 is caused to extend beyond the lever 68 and it requires repeated ratchet actions to release the latch member 28. In this case also the compensating means comes into play as above described. In operation, the heating elements of the toaster are maintained energized continuously for a period of time depending upon the adjustment of the color control knob, and after the initial opening of the switch, the crisping part of the cycle takes place, the switch being repeatedly closed and opened, causing successive ratchet movements of the rod 75 until the latch member 28 is released. The duration of the crisping part of the cycle is dependent on the setting of the crispness control knob 91 which determines the initial setting of the rod 75.

It should be noted that the friction ratchet device has an important characteristic which is of especial advantage in this particular device, and which produces a result that is not believed to be apparent. During the crisping operation, the amount of creep and return movement of the jam plate 79, and the consequent movement of the rod 75, depends on the temperature that the wire 83 has attained at the instant of deenergization of the circuit, of which said wire is a part, and the temperature to which said wire cools during the period of deenergization of said circuit. Hence the total length of rod travel will depend on the cycling characteristics of the bread-sensitive thermostat 29, for this governs the temperature which the wire will attain at the end of a specific energization period and the length of the particular cooling interval which follows said energization period. It should be noted that the contraction intervals of the wire are not necessarily constant and therefore it is very desirable that the varying length of wire displacements be accurately reflected into ratchet displacements. The friction ratchet responds to the exact displacements of the wire, and thus effects movement of rod 75 in exact accordance with the operating stroke of the reciprocatory thermal means constituted by the wire 83 and plate 84.

In prior art devices where a toothed ratchet system is used, the inherent accuracy of response is limited by the minimum spacing of the teeth, for the movement of the ratchet can only be in discrete steps which are some multiple of this minimum tooth spacing. Thus, it is possible for an actuating pawl moved by a current-heated wire, or equivalent, during heating thereof to align itself just ahead of or adjacent to the peak of a ratchet tooth and during subsequent contraction of the wire for the pawl to miss almost a full tooth spacing. If the teeth are spaced very closely to minimize the error due to the inability of the toothed ratchet to respond to infinitely variable steps, they are found to be vulnerable to excessive wear and are therefore incapable of withstanding repeated operation throughout the life of the toaster.

While the toaster is primarily and essentially an automatic toaster, it should be noted that the latch member 28 can be tripped manually at any time by depressing the color adjustment knob 55. As previously mentioned, the outer end of shaft 42 is slightly movable vertically in the slotted ear 56, and such movement will move the latch member to non-latching position.

From the foregoing description, it will be seen that the invention provides a novel toaster construction which is particularly characterized in the novel mechanism for controlling the crisping part of the toasting cycle. It will be apparent, of course, that the invention is not limited to the specific structure shown but is capable of various modifications and other embodiments.

I claim:

1. In a bread toaster, a bread carriage movable between toasting and non-toasting positions, spring means urging said carriage toward the non-toasting position, latch means including a movable member effective when held in latching position to retain said carriage in the toasting position, a slide bar engageable with said movable member to hold the latter in latching position, spring means urging said slide bar in a direction tending to maintain engagement of said slide bar with said movable member, an actuating element frictionally engageable with said bar and operable to effect step-by-step movement of the bar to release said latch means, and thermostatic means for operating said element, said slide bar being held in each advanced position by frictional engagement of said member therewith due to the action of said first-mentioned spring means.

2. In a bread toaster, a bread carriage movable between toasting and non-toasting positions, spring means urging said carriage toward the non-toasting position, latch means for restraining said carriage in the toasting position, a slide bar engageable with said latch means and movable out of engagement therewith to effect release of said carriage, spring means urging said slide bar to a position for engagement with said latch means, a jam plate having an opening therein through which said bar extends, spring means urging said jam plate to an oblique position relative to said bar to effect frictional engagement of said plate with said bar, means effective to dispose said plate in a position substantially perpendicular to said bar when said carriage is in the non-toasting position but rendered ineffective by the carriage when the latter is in the toasting position, and thermostatic means for actuating said plate to cause movement of said slide bar out of engagement with said latch means, the consequent release of said carriage permitting said plate to be positioned in perpendicular relation to said bar as aforementioned, thus permitting return of said bar to its latch retaining position.

3. In a bread toaster, a bread carriage movable between toasting and non-toasting positions, spring means urging said carriage toward the non-toasting position, latch means for restraining said carriage in the toasting position, a slide bar engageable with said latch means and movable out of engagement therewith to effect release of said carriage, an actuating element frictionally engageable with said bar to effect movement thereof, a current-conductive expansible and contractible wire arranged to operate said element, and a thermostatic switch connected in series with said wire to control the energization thereof.

4. In a bread toaster, a vertical bread well, a bread carriage for supporting a bread slice in said well and movable vertically between toasting and non-toasting positions, spring means urging said carriage upward toward the non-toasting position, latch means at the lower part of the toaster for restraining said carriage in its lowered toasting position, a slide bar in the base of the toaster engageable with said latch means and movable out of engagement therewith to effect release of said carriage, an actuating element in the base of the toaster frictionally engageable with said bar to effect movement thereof, a current-conductive expansible and contractible wire arranged in the base of the toaster to operate said element, thermomotive means arranged to be responsive to the temperature of a bread slice in said well, and a switch in the base of the toaster operable by said thermomotive means and connected in series with said wire to control the energization thereof.

5. In a bread toaster, a bread carriage movable between toasting and non-toasting positions, spring means urging said carriage toward the non-toasting position, latch means for restraining said carriage in the toasting position, a slide bar engageable with said latch means to hold the latter in latching position and movable out of engagement therewith to effect release of said carriage, an actuating element frictionally engageable with said bar to effect movement thereof, and thermostatic means for operating said element.

6. In a bread toaster, a bread carriage movable between toasting and non-toasting positions, spring means urging said carriage toward the non-toasting position, latch means for restraining said carriage in the toasting position, a slide bar engageable with said latch means to hold the latter in latching position and movable out of engagement therewith to effect release of said carriage, an actuating element frictionally engageable with said bar to effect movement thereof, current-operable thermomotive means arranged to operate said element, and a thermostatic switch connected in series with said thermomotive means to control the energization thereof.

7. In a bread toaster, a bread carriage movable between toasting and non-toasting position, spring means urging said carriage toward the non-toasting position, latch means for restraining said carriage in the toasting position, a slide bar engageable with said latch means and movable out of engagement therewith to effect release of said carriage, spring means urging said slide bar to a position for engagement with said latch means, a jam plate having an opening therein through which said bar extends, spring means urging said jam plate to an oblique position relative to said bar to effect frictional engagement of said plate with said bar, means effective to dispose said plate in a position substantially perpendicular to said bar when said carriage is in the non-toasting position but rendered ineffective by the carriage when the latter is in the toasting position, a current-conductive expansible and contractible wire arranged to actuate said plate, and a thermostatic switch connected in series with said wire to control the energization thereof, the release of said carriage permitting said plate to be positioned in perpendicular relation to said bar as aforementioned, thus permitting return of said bar to its latch-retaining position.

8. In a bread toaster, a bread carriage movable between toasting an non-toasting positions, latch means including a movable member effective when held in latching position to retain said carriage in the toasting position, a slide bar engageable with said movable member to hold the latter in latching position, means urging said slide bar in a direction tending to maintain engagement of said slide bar with said movable member, an actuating element frictionally engageable with said bar and operable to effect step-by-step movement of the bar in a direction to release said latch means, thermostatic means for operating said element, and means for holding said slide bar in each position of advancement thereof by said element.

9. In a bread toaster, a bread carriage movable between toasting and non-toasting positions, spring means urging said carriage toward the non-toasting position, latch means including a movable member effective when held in latching position to retain said carriage in the toasting position, a slide bar engageable with said movable member to hold the latter in latching position and movable out of engagement therewith to effect release of said carriage, manually-adjustable means for varying the initial position of said slide bar so as to vary the extent of travel thereof necessary to release said latch means, spring means urging said slide bar in a direction tending to maintain engagement of said slide bar with said movable member, an actuating element frictionally engageable with said bar and operable to effect step-by-step movement of the bar to release said latch means, and thermostatic means for operating said element, said slide bar being held in each advanced position by frictional engagement of said member therewith due to the action of said first-mentioned spring means.

10. In a bread toaster, a bread carriage movable between toasting and non-toasting positions, spring means urging said carriage toward the non-toasting position, latch means including a movable member effective when held in latching position to retain said carriage in the toasting position, a slide bar engageable with said movable member to hold the latter in latching position, spring means urging said slide bar in a direction tending to maintain engagement of said slide bar with said movable member, an actuating element frictionally engageable with said bar and operable to effect step-by-step movement of the bar to release said latch means, means including an adjustable thermostatic switch for operating said element, the adjustment of said switch determining the color of the toast, said slide bar being held in each advanced position by frictional engagement of said member therewith due to the action of said first-mentioned spring means, and manually-controllable means for adjusting the initial position of said bar to give a desired degree of crispness of the toast, and for adjusting said switch in accordance with the particular crispness setting, thereby to compensate for the amount of additional color imparted to the toast during the crisping period.

11. In a bread toaster, a controlling thermostat, a switch operated thereby and manually adjustable according to the color of the toast desired through a manual control provided therefor, reciprocatory thermal motor means in circuit with said switch and operated by cyclic closing and opening of the switch, the stroke of the thermal motor means being dependent upon the cycling characteristics of the controlling thermostat, a slide bar movable from an initial position to a final position, means controlled by said bar to terminate the toasting operation upon the bar reaching said final position, an element operated by said motor means and frictionally engageable with said bar to actuate the same in exact accordance with the operating stroke of said motor means, and manually-adjustable means for adjusting the initial position of said bar to give the desired degree of crispness of the toast, and for adjusting said switch in accordance with the particular crispness setting, thereby to compensate for the amount of additional color imparted to the toast during the crisping period.

12. A bread toaster according to claim 11, including a thermostat arranged to be sensitive to the surface temperature of a bread slice.

13. In a bread toaster, a controlling thermostat, a switch comprising a pair of contacts one of which is movable by said thermostat, a color-adjustment manual means operable to vary the amount of thermostat movement necessary to effect operation of said switch, reciprocatory thermal motor means in circuit with said switch and operated by cyclic closing and opening of the switch, a slide bar movable from an initial position to a final position, means controlled by said bar to terminate the toasting operation upon the bar reaching said final position, an element operated by said motor means and frictionally engageable with said bar to actuate the same, and manually-adjustable means for controlling the total amount of movement of said bar to give the desired degree of crispness of the toast, and for adjusting the second contact of said switch in accordance with the particular crispness setting, thereby to compensate for the amount of additional color imparted to the toast during the crisping period, so as to produce toast of desired color and crispness according to the settings of the color and crispness adjusting means.

HENRY F. HILD.

REFERENCES CITED

The following references are of record in the file of this patent:

UNITED STATES PATENTS

| Number | Name | Date |
|---|---|---|
| 1,987,703 | Oneill | Jan. 15, 1935 |
| 2,151,705 | Lavenburg | Mar. 28, 1939 |
| 2,255,261 | Lucker | Sept. 9, 1941 |
| 2,332,171 | Sardeson | Oct. 19, 1943 |
| 2,336,640 | Sardeson | Dec. 14, 1943 |
| 2,337,124 | Olving | Dec. 21, 1943 |
| 2,364,175 | Turner | Dec. 5, 1944 |
| 2,388,641 | Myers | Nov. 6, 1945 |
| 2,396,541 | Taylor | Mar. 12, 1946 |
| 2,436,735 | Walder et al. | Feb. 24, 1948 |